United States Patent
Best et al.

(10) Patent No.: US 9,839,986 B2
(45) Date of Patent: Dec. 12, 2017

(54) PERFORMING SURFACE TREATMENTS USING AN AUTOMATED GUIDED VEHICLE

(71) Applicant: The Boeing Company, Chicago, IL (US)

(72) Inventors: Steven A. Best, Marysville, WA (US); Eric M. Reid, Kenmore, WA (US); Donald Joe Best, III, Arlington, WA (US); Daniel M. McDonagh, Seattle, WA (US); Paul Edward Jennerjohn, Sammamish, WA (US); David McCaig, Mill Creek, WA (US); Paul G. Solecki, Bothell, WA (US); Eric J. Schaefer, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 478 days.

(21) Appl. No.: 14/534,397

(22) Filed: Nov. 6, 2014

(65) Prior Publication Data
US 2016/0130017 A1   May 12, 2016

(51) Int. Cl.
| | |
|---|---|
| B64F 5/00 | (2017.01) |
| B24B 23/00 | (2006.01) |
| B05B 13/00 | (2006.01) |
| B25J 11/00 | (2006.01) |
| B25J 9/16 | (2006.01) |
| B25J 5/00 | (2006.01) |
| B25J 5/04 | (2006.01) |
| B64F 5/40 | (2017.01) |
| G05B 19/418 | (2006.01) |

(52) U.S. Cl.
CPC .......... *B24B 23/00* (2013.01); *B05B 13/005* (2013.01); *B25J 5/007* (2013.01); *B25J 5/04* (2013.01); *B25J 9/1664* (2013.01); *B25J 11/005* (2013.01); *B25J 11/0065* (2013.01); *B25J 11/0075* (2013.01); *B64F 5/40* (2017.01); *G05B 19/41895* (2013.01); *G05B 2219/31086* (2013.01); *G05B 2219/50393* (2013.01); *Y10S 901/01* (2013.01); *Y10S 901/41* (2013.01); *Y10S 901/43* (2013.01)

(58) Field of Classification Search
None
See application file for complete search history.

(56) References Cited

U.S. PATENT DOCUMENTS

| | | | |
|---|---|---|---|
| 5,248,341 A | 9/1993 | Berry, Jr. et al. | |
| 5,910,894 A * | 6/1999 | Pryor | G05B 19/41875 219/121.64 |
| 7,350,890 B2 | 4/2008 | Baird et al. | |
| 8,088,450 B2 | 1/2012 | Swanberg et al. | |
| 8,455,054 B2 | 6/2013 | Brewer et al. | |
| 2010/0180711 A1 * | 7/2010 | Kilibarda | B05B 15/0225 74/490.06 |

OTHER PUBLICATIONS

Mathis, "Aircraft Coating Application System and Method," U.S. Appl. No. 14/289,471, filed May 28, 2014, 55 pages.

* cited by examiner

*Primary Examiner* — Nathan T Leong
(74) *Attorney, Agent, or Firm* — Yee & Associates, P.C.

(57) ABSTRACT

A low-profile, automated guided vehicle (AGV) performs surface treatments over large areas of a structure having limited access, such as an aircraft underbelly. The AGV includes a movable gantry provided with automated robot. The robot has interchangeable end effectors for carrying out the surface treatments. Travel of the AGV relative to structure is controlled by a ground guidance system.

14 Claims, 14 Drawing Sheets

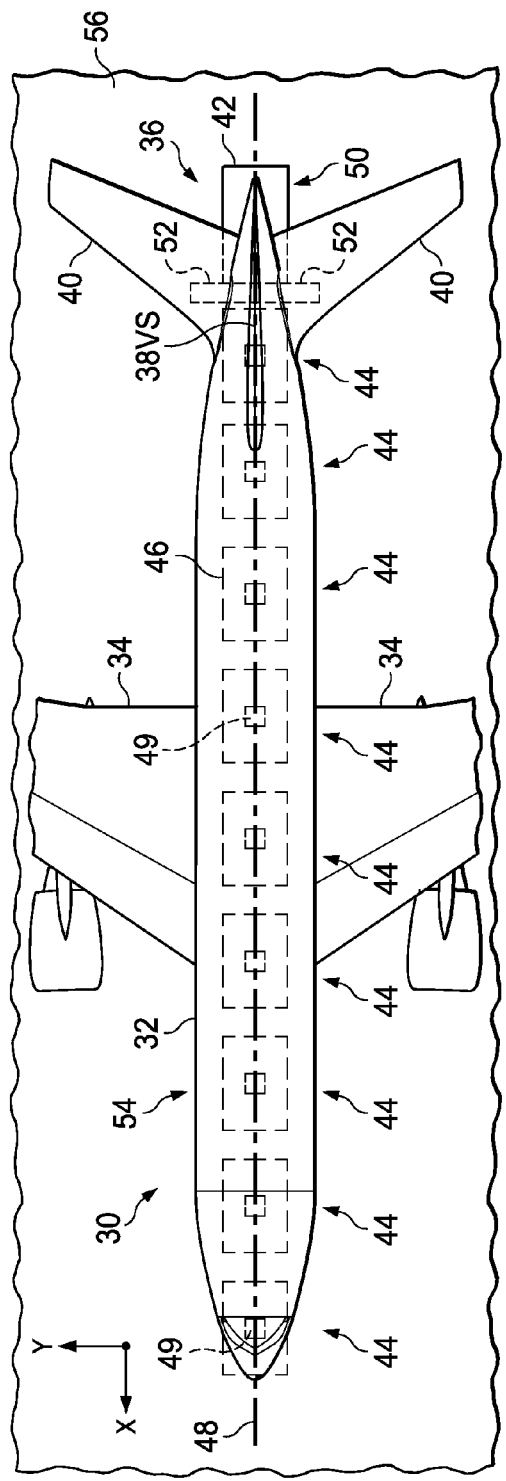
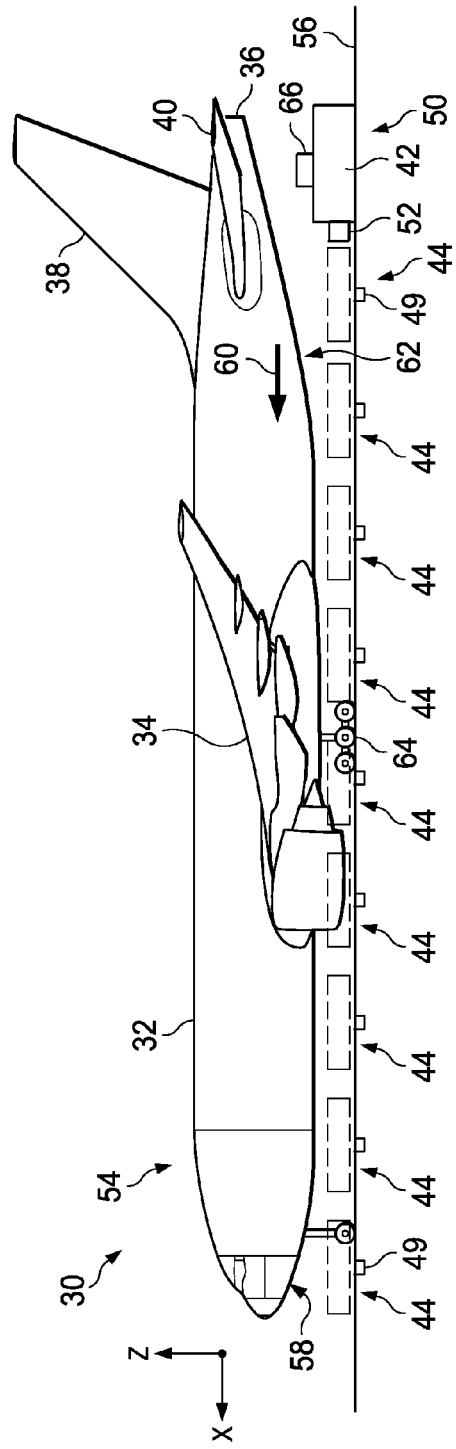
FIG. 1
FIG. 2

PERFORMING SURFACE TREATMENTS USING AN AUTOMATED GUIDED VEHICLE

BACKGROUND INFORMATION

1. Field

The present disclosure generally relates to techniques and equipment for performing surface treatments over large areas, and deals more particularly with an automated method and apparatus for performing surface treatments using an automated guided vehicle.

2. Background

It is sometimes necessary to treat large and/or complex surface areas of a structure. For example, paint or other coatings are often applied to the outer surfaces of vehicles such as airplanes, usually by spray coating, within a paint booth or similar confined area. Due to the contours and/or features of aircraft skins, surface preparation such as sanding, scuffing, cleaning and subsequent painting are often carried out by hand. However, material surface preparation and painting is labor intensive, slow and may be subject to human error.

Attempts have been made to partially automate surface preparation and/or painting processes using robots to move sanding heads and paint spray heads over the skin of the aircraft, however these known robotic processes have limitations. For example, because of the size of commercial aircraft, robotic painters must be repositioned a number of times in order to reach most areas of the aircraft. Repositioning of the robots requires adjusting the robot relative to each section of the aircraft at each new placement position of the robot. Moreover, known robotic painters may not be able to reach certain areas of the aircraft, such as the underbelly or keel due to the limited space between the underbelly and the ground. Thus, even when robotic painters are employed, the underbelly of the aircraft as well as other hard-to-reach surfaces must be painted by hand. The task of automating surface treatment of aircraft skins is further complicated by the volatile nature of solvents, coatings and paints which must be applied in explosion proof environments, such as large area paint booths where the presence of potential ignition sources should be minimized.

Accordingly, there is a need for a method and apparatus for treating surfaces of a structure such as an aircraft, which are fully automated and capable of reaching surface areas that are located within confined areas and/or areas having limited access. There is also a need for a method and apparatus of the type mentioned above which may be safely used in explosion proof environments where ignition sources are to be avoided.

SUMMARY

The disclosed embodiments provide a method and apparatus for treating surfaces, particularly those located in confined spaces having limited access. The disclosed embodiments automate the process of preparing and coating sections of an aircraft, such as an underbelly, which substantially eliminates the need for labor intensive, manual preparation and coating application. The apparatus may be easily reconfigured for use with aircraft of various sizes and geometric configurations. The embodiments are particularly well-suited for use in environments where ignition sources are to be avoided, such as paint booths.

According to one disclosed embodiment, apparatus is provided for automated treatment of a surface of a structure. An automated guided vehicle (AGV) is configured to travel along a path in proximity to the structure. A plurality of position markers are spaced apart from each other along the path, wherein each of the markers defines a position of the AGV at which automated treatment of the surface is to be performed. The AGV includes at least one sensor for sensing the position of each of the position markers. A gantry is mounted on the AGV for movement along a first axis, and a robot is mounted on the gantry for movement along a second axis. Interchangeable end effectors on mounted on the robot for performing surface treatments. One or more on-board controllers are provided that are configured to control the AGV, the gantry and the robot.

According to another disclosed embodiment, apparatus is provided to perform surface treatment of an underbelly of an aircraft. A low profile automated guided vehicle (AGV) is guided along a path beneath the underbelly. The AGV includes at least one robot having an end effector for performing surface treatment of the underbelly. The apparatus includes a guidance system for guiding travel of the AGV along the path, and a position detection system for detecting the position of the AGV along the path.

According to still another disclosed embodiment, an automated method is provided of treating a surface of an aircraft located on the ground. The aircraft is moved into a fixed position on the ground, and the spatial coordinates of aircraft at the fixed position are determined. An AGV is moved into a starting position adjacent the aircraft, and the spatial coordinates of AGV are determined. The spatial coordinates of AGV are translated into the spatial coordinate system of the aircraft at the fixed position. The AGV is then moved along a path of travel and is used to perform surface treatment of the aircraft.

According to a further embodiment, a method is provided of treating an underbelly surface of at least two differing aircraft on the ground. A guide wire is configured on the ground based on characteristics of a first aircraft. A robot having an end effector is mounted on an automatic guided vehicle (AGV). The AGV is moved to each of a plurality of positions along the length of the first aircraft. Treatment of the underbelly surface is performed at each of the positions along the length of the first aircraft. The guide wire is used to guide the movement of the AGV along the length of the first aircraft. The guide wire is then reconfigured on the ground based on characteristics of a second aircraft. The AGV is moved to each of a plurality of positions along the length of the second aircraft, using the reconfigured guide wire to guide the movement of the AGV. Underbelly treatment is performed at each of the positions along the length of the second aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 1 is an illustration of a diagrammatic top plan view of an aircraft, wherein sequential park positions of an automated guided vehicle (AGV) are shown in broken lines.

FIG. 2 is an illustration of a diagrammatic side elevational view of the aircraft and AGV shown in FIG. 1.

DETAILED DESCRIPTION

Figure 3:
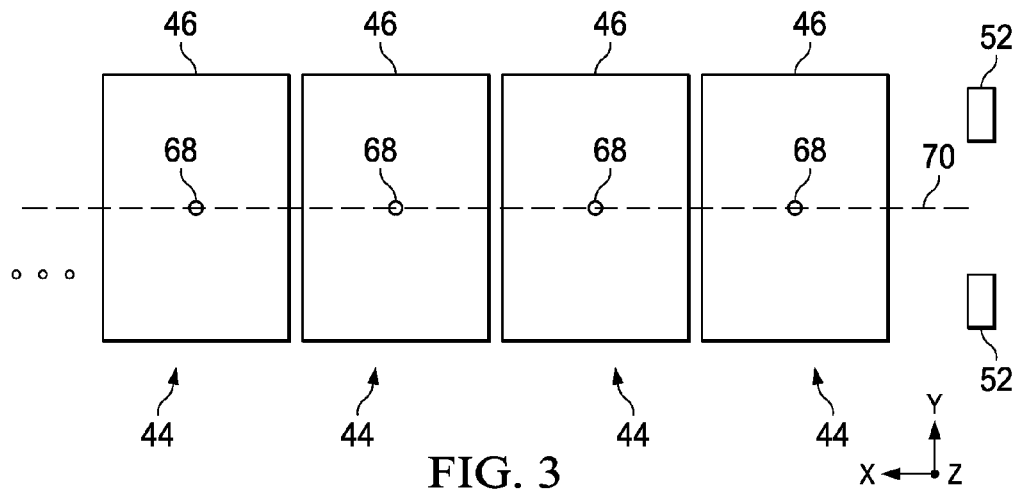
FIG. 3 is an illustration of a diagram showing several profile scans of the aircraft's underbelly that are used to establish the centerline of the aircraft.

Referring first to FIGS. 1 and 2, an aircraft 30 is staged by moving it into a fixed park position 54 on the ground 56 or similar supporting surface where surface treatments on the aircraft 30 are to be carried out. For example, aircraft 30 may be parked in an explosion proof environment (not shown) such as a paint booth, in a hanger or in a production factory. The aircraft 30 includes a fuselage 32 with a nose cone 58, a pair of wings 34 and a tail assembly 36. The fuselage 32 has an underbelly 62 with limited clearance above the ground 56. The tail assembly 36 may include a vertical stabilizer 38 and a pair of horizontal stabilizers 40. While the drawings illustrate an airplane, the disclosed embodiments may be employed to carry out automated surface treatment of other sizes and forms of aircraft 30.

Surface treatments of the aircraft 30 are carried out by an automated guided vehicle (AGV) 42. While the drawings illustrate surface treatment of the aircraft's underbelly 62, the disclosed embodiments may be employed for automated surface treatment of various other parts of the aircraft 30, such as, without limitation, the underside of the wings 34, the underside of the horizontal stabilizers 40 and the vertical stabilizer 38. The AGV 42 is guided by a guide wire 48 and a plurality of longitudinally spaced, electronic position markers 49, each of which may comprise, for example and without limitation, a radio frequency identification (RFID) tag 49 which may be on the active or passive type. A variety of alternate forms of position markers may be employed, depending on the environment.

The guide wire 48 may be permanently or temporarily arranged on, or embedded in the ground 56, and configured along a desired path of AGV travel which, in this case, is generally along the centerline of the aircraft's underbelly 62 between the aircraft's wheels 64. In one embodiment, the guide wire 48 is reconfigurable on the ground 56 in order to adapt the AGV 42 for use in surface treatment of a variety of aircraft sizes and geometries. The position markers 49 may be permanently mounted on the ground 56, or may be temporarily mounted on the ground 56 to facilitate reconfiguration to suit various aircraft having differing characteristics, such as, without limitation, differing sizes, features and structural geometries.

The guide wire 48 guides the movement of the AGV 42 in the X-Y plane, and each of the position markers 49 designates a position along the guide wire 48 (hereinafter "park position") where the AGV 42 temporarily parks while carrying out a surface treatment operation. The AGV 42 is initially aligned along the X axis by a set of chocks 52 on the ground 56. The chocks 52 define the starting position of the AGV 42 and are indexed to the positions of the position markers 49.

Referring now to FIGS. 1-3, the AGV 42 may be used to determine a centerline 70 of the aircraft 30 in order to align the AGV 42 with the aircraft 30. A scanner 66 (FIG. 2) is provided for scanning the surface of the aircraft 30, such as the surface of the underbelly 62. The scanner 66, which may be an optical scanner 66 or other scanner suitable for the application, is mounted on the AGV 42 with a view of the surface to be treated, which in the illustrated example, is the underbelly 62. In order to determine the centerline 70 of the aircraft 30, the AGV 42 is moved along the guide wire 48 from the chocks 52 to successive park positions 44. The scanner 66 scans the underbelly 62 at each of the park positions 44, and records a series of successive profile scans 46. Center points 68 of the scans 46 along the Y axis are determined using a later discussed, on-board controller, and a best fit centerline 70 passing through the center points 68 is calculated. As will be discussed later, the centerline 70 is used in calculations carried out to transform the spatial coordinates of the AGV 42 into the coordinate system of the aircraft 30.

Figure 4:
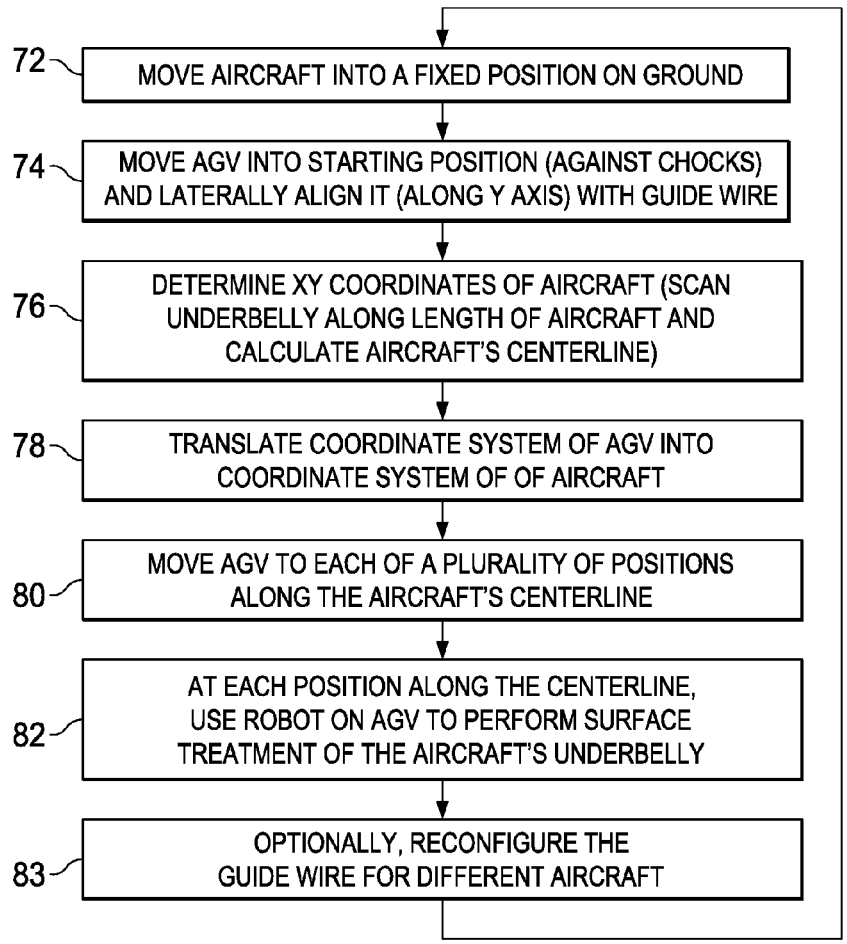
FIG. 4 is an illustration of a flow diagram of a method of performing surface treatment of a structure using the AGV.

FIG. 4 broadly illustrates the overall steps of a method of performing surface treatment of a section of an aircraft 30, such as the aircraft's underbelly 62, using one or more robotically controlled, interchangeable end effectors. Beginning at 72, the aircraft 30 is staged by moving it into a fixed position on the ground 56, in general alignment with the guide wire 48. At 74, the AGV 42 is moved (along the X axis) into a starting position 50 against chocks 52. The AGV 42 is then laterally aligned (along the Y axis) with the guide wire 48, thereby establishing the initial X-Y coordinates of the AGV 42. At 76, the X-Y coordinates all the aircraft 30 are determined by scanning the underbelly 62 along the length of the aircraft, and using these scans to calculate the aircraft's centerline.

At 78, the spatial coordinates (X and Y) of the AGV 42 are translated into the coordinate system of the aircraft 30. At 80, the AGV 42 is moved to each of a plurality of park positions 44. At 82, at each of the park positions 44 along the centerline 70, a robot on the AGV 42 is used to perform surface treatment of the aircraft's underbelly 62 using one of the interchangeable end effectors. The surface treatment may include, but is not limited to sanding, scuffing and the application of solvents, paints or other coatings. Once a desired surface treatment of the aircraft's underbelly 62 has been performed at each of the park positions 44 using a particular end effector, such as a sander, the AGV 42 returns to its starting position 50, in preparation for carrying out a subsequent surface treatment operation on the underbelly 62.

With the AGV 42 returned to its starting position 50, the end effector used to carry out the previous surface treatment operation may be removed from the robot and replaced by a different end effector, such as a spray head for applying solvent or paint. With a replacement end effector having been installed, the process of moving the AGV 42 from its starting position 50 to each of the park positions 44 is repeated. A second surface treatment operation such as solvent spray or painting is performed at each of the park positions 44. The process of exchanging end effectors on the robot and moving the AGV 42 along the centerline 70 of the aircraft 30 to each of the park positions 44 is repeated until all of the necessary surface treatments have been completed. Optionally, at step 83, the guide wire 48 may be reconfigured for a different aircraft 30 and steps 72-82 may be repeated.

Figure 4A:
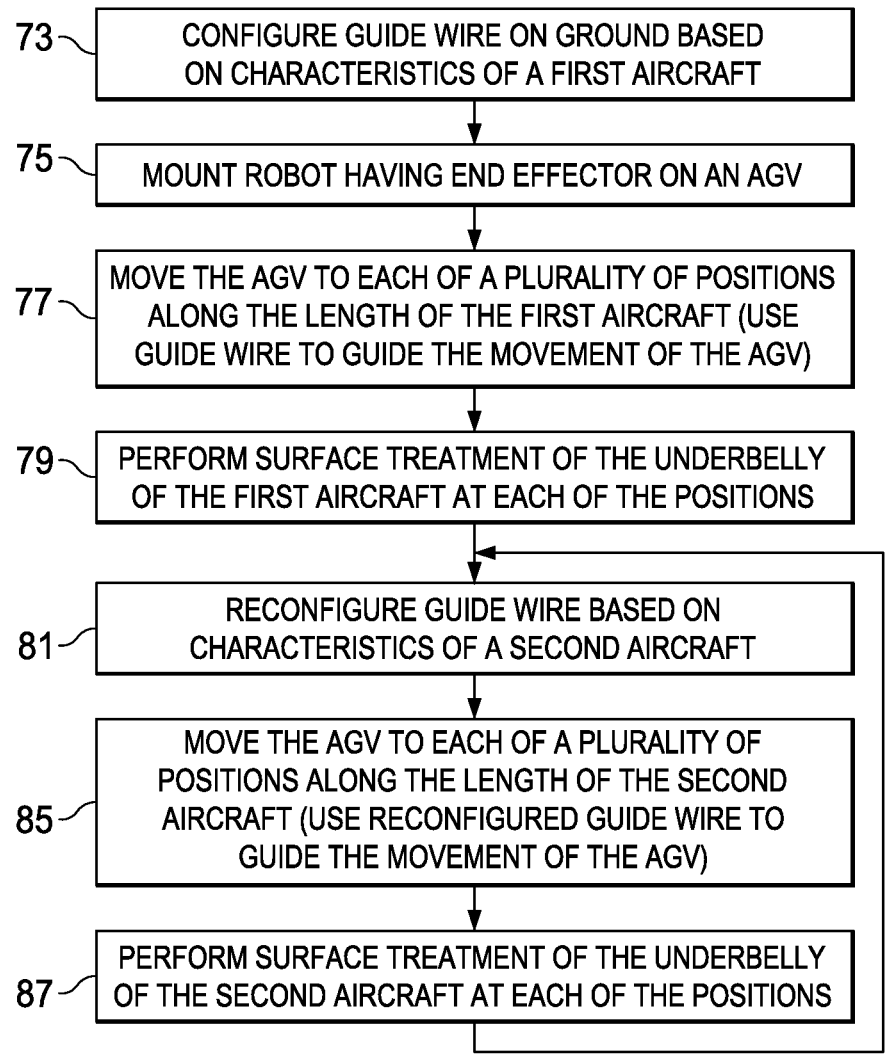
FIG. 4A is an illustration of a flow diagram of a method of performing surface treatment of the underbellies of multiple, differently configured aircraft using the AGV.

Referring now to the FIG. 4A, the disclosed embodiments may be employed to perform surface treatment on the underbellies 62 of multiple aircraft 30 that are differently configured or which have differing characteristics, in terms of size, features and/or geometries. Beginning at 73, a guide wire 48 is configured on the ground 56 based on characteristics of a first aircraft 30 such as, without limitation, the length and or width of the underbelly 62. At 75, a robot having an end effector is mounted on the AGV 42. At 77, the AGV 42 is moved to each of a plurality of positions 44 along the length of the first aircraft 30. The guide wire 48 is used to guide the movement of the AGV 42 along the length of the first aircraft 30.

As shown at 79, at each of the positions 44, surface treatment of the underbelly 62 of the first is performed. At 81, the guide wire 48 is reconfigured on the ground 56 based on characteristics of a second aircraft 30. At 85, the AGV 42 is moved to each of a plurality of positions 44 along the length of the second aircraft 30, using the reconfigured guide wire 48 to guide the movement of the AGV 42. At 87, surface treatment of the underbelly 62 of the second aircraft 30 is performed at each of the positions 44. Underbelly surface treatment of additional aircraft 30 having differing characteristics may be carried out by repeating steps 81, 85 and 87.

Figure 5:
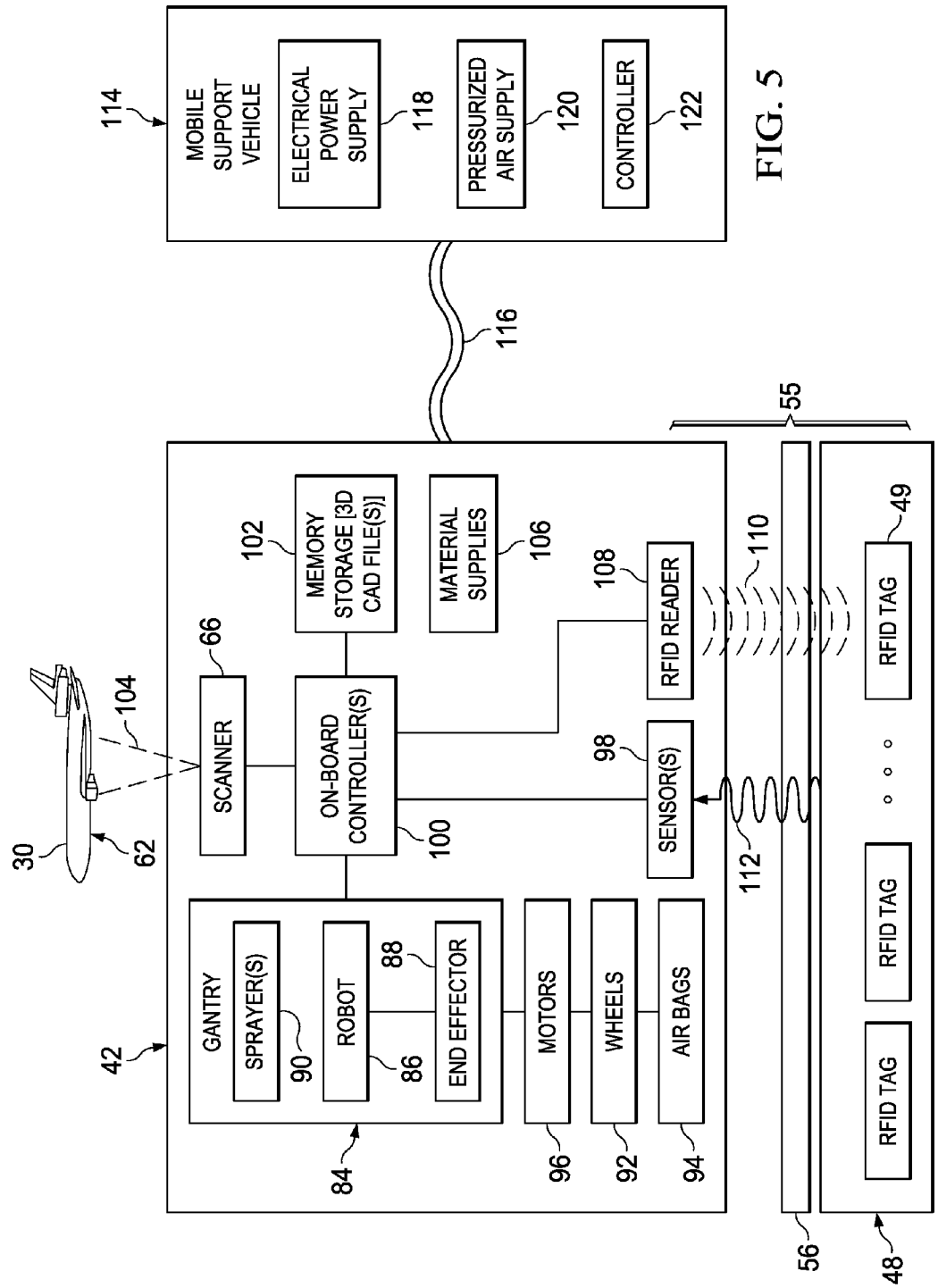
FIG. 5 is an illustration of a combined block and diagrammatic view of an automated system for treating surface areas of an aircraft.

Attention is now directed to FIG. 5 which broadly illustrates, in block diagram form, the components of a system for surface treatment of structures such as an underbelly 62 or other parts of an aircraft 30. The system broadly includes an AGV 42, a ground guidance system 55 and optionally, a mobile support vehicle 114 which is tethered to the AGV 42 by an umbilical cord 116. The AGV 42 includes a X-Y gantry 84 upon which there is mounted a robot 86 and one or more sprayers 90 which may be in the form of, for example and without limitation, a manifold block (not shown).

The robot 86 is mounted on the gantry 84 for movement along X and Y orthogonal axes. The robot 86 includes one or more interchangeable surface treatment end effectors 88 for carrying out surface treatment on the underbelly 62 of the aircraft 30. The end effectors 88 may include, for example and without limitation, a sander or spray head for spraying liquids onto the surfaces being treated. The AGV 42 is provided with a set of multi-directional movement wheels 92 that are mounted on airbags 94 which raise the wheels 92 and thereby lower the AGV 42 onto the ground 56 at each of the park positions 44 previously discussed. A series of motors 96 are provided on the AGV 42 for controlling movement of the gantry 84 as well as the robot 86 and the wheels 92.

The AGV 42 further includes one or more on-board controllers 100 which may comprise general or special purpose computers or PLCs (programmable logic controllers). Separate controllers 100 may be provided for respectively controlling the AGV and the robot 86. The on-board controllers 100 have access to on-board memory storage 102 in which various operating and control programs may be stored as well as 3-D and CAD files defining the surface areas of the underbelly 62 or other surfaces to be treated. In some embodiments, the AGV 42 may be fully autonomous and programmed to carry out all surface treatment operations automatically, including movement of the AGV 42 along the centerline 70 of the aircraft 30 and manipulation/control of the robot 86 and end effector 88. However in other embodiments, the AGV 42 may be only partially automated, and may require an operator to input instructions/commands to the onboard controller 100.

Although not shown in the drawings, in one embodiment, one or more onboard input/output devices such as touch screen displays may be provided on the AGV 42 that are coupled with the controllers 100 and allow programming of and data retrieval from the AGV 42. In other embodiments, commands and instructions may be wirelessly delivered to the AGV 42, and similarly, data may be wirelessly retrieved from the AGV 42 using suitable wireless communication equipment. In those embodiments where a mobile support vehicle 114 is employed, the input/output devices mentioned above may be located on the mobile support vehicle 114. The AGV 42 may also include on-board material supplies 106 such as containers of solvents and coatings. One or more scanners 66 mounted on the gantry 84 or elsewhere on the AGV 42 function to scan 104 the underbelly 62 and recorded profile scans of the underbelly that are used to determine the centerline 70 of the aircraft, as previously discussed.

The ground guidance system 55 includes, as previously discussed, an embedded guide wire 48 along with a series of position markers which, in illustrative embodiment, comprise radio frequency identification (RFID) tags 49, sometimes referred to as RFID tags. The ground guidance system 55 also includes a wireless RFID reader 108 on-board the AGV 42 which reads 110 the RFID tags 49, as well as one or more on-board sensors 98 for wirelessly sensing the position of the guide wire 48. The on-board sensors 98 may comprise, without limitation inductive pickups which sense changes in magnetic field 112 produced by the guide wire 48.

The mobile support vehicle 114 may be employed in environments where it may be necessary for safety or other reasons to remotely locate certain utilities or supplies used in the surface treatment process. For example, a mobile support vehicle 114 may be useful in painting or similar operations where potential ignition sources such as electrical power supplies 118 are to be avoided in the immediate area where the surface treatment operations are being performed, such as within a paint booth. In the illustrated embodiment, the mobile support vehicle 114 includes an on-board electrical power supply 118 as well as a pressurized air supply 120 which supply electrical power and a pressurized air through an umbilical cord 116 to the AGV 42. A controller 122 on-board the mobile support vehicle 114 controls electrical power supply 118 and a pressurized air supply 120 in accordance with requirements of the AGV 42.

The mobile support vehicle 114 may be moved from location-to-location depending upon where the AGV 42 is carrying out surface treatment operations. For example, when surface treatment operations are moved from hanger-to-hangar, the mobile support vehicle 114 may be moved along with the AGV 42. During a surface treatment operation, however, the mobile support vehicle 114 may be located outside of the area where the surface treatment is being perform, for example outside of a spray paint booth, thereby isolating the electrical power supply 118 from flammable solvents, paints other coatings being applied to the aircraft 30.

Figure 6:
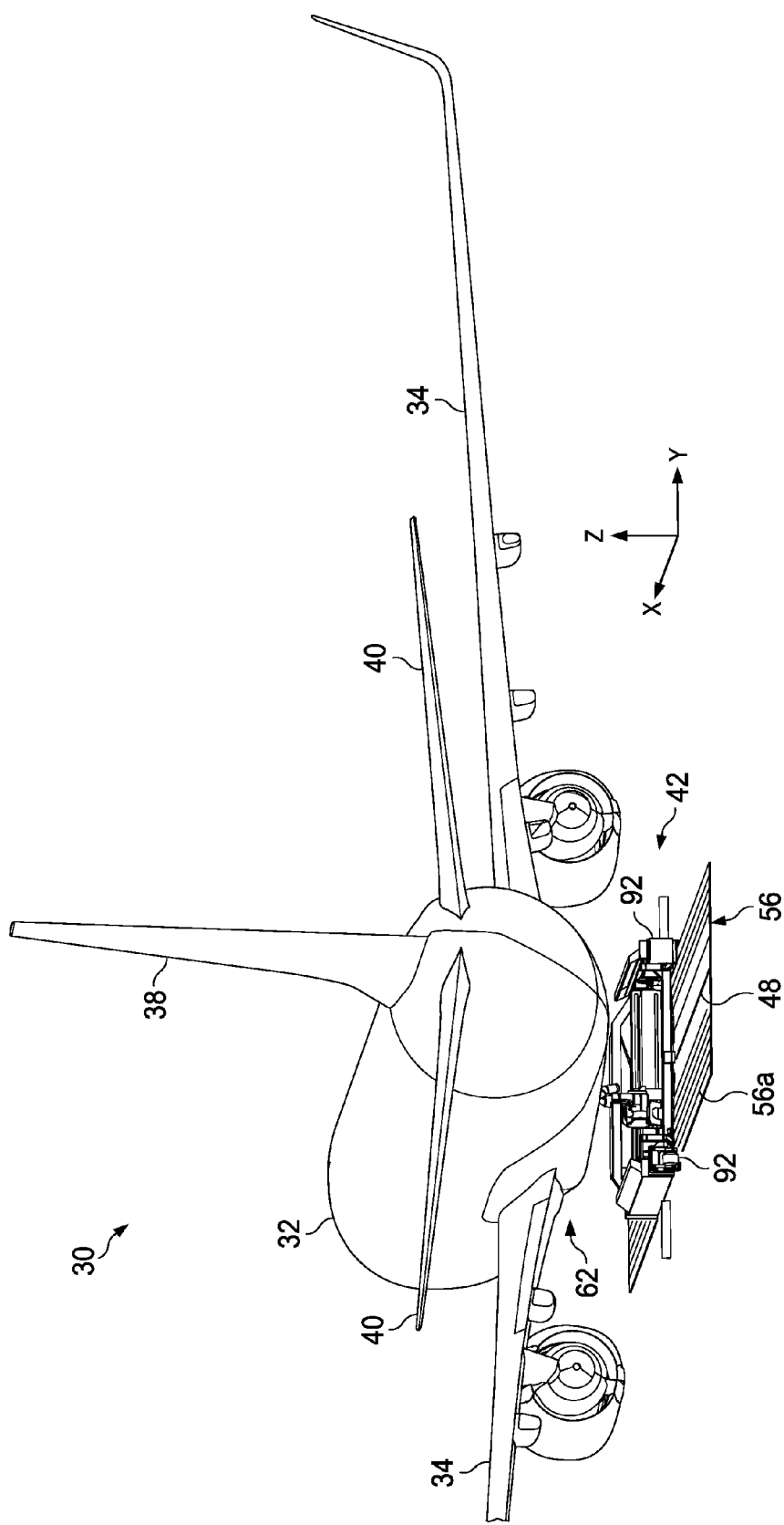
FIG. 6 is an illustration of a rear perspective view of an aircraft and AGV.
Figure 7:
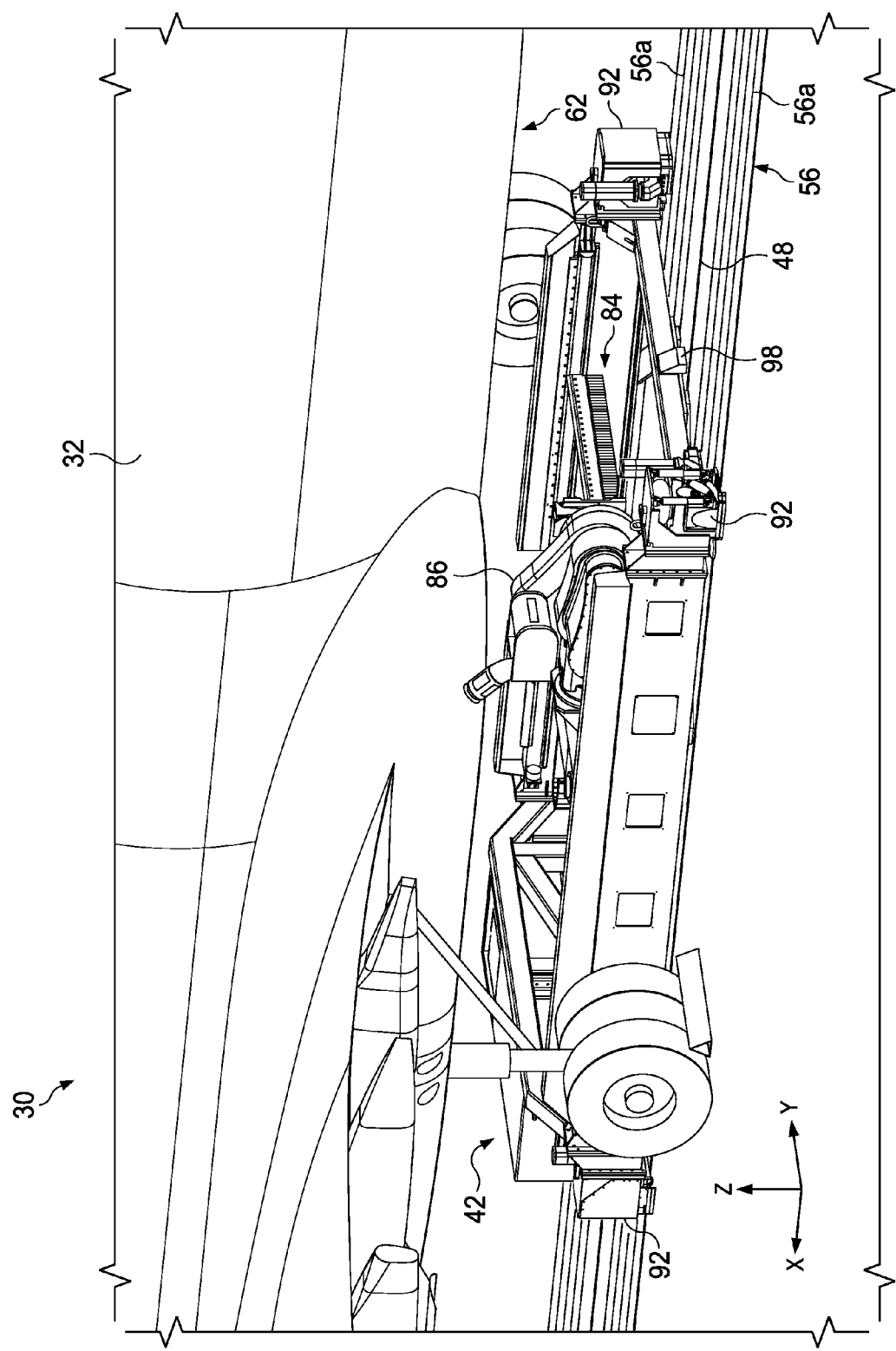
FIG. 7 is an illustration of an enlarged perspective view of the AGV carrying out a surface treatment operation on the underbelly of the aircraft shown in FIG. 6.
Figure 8:
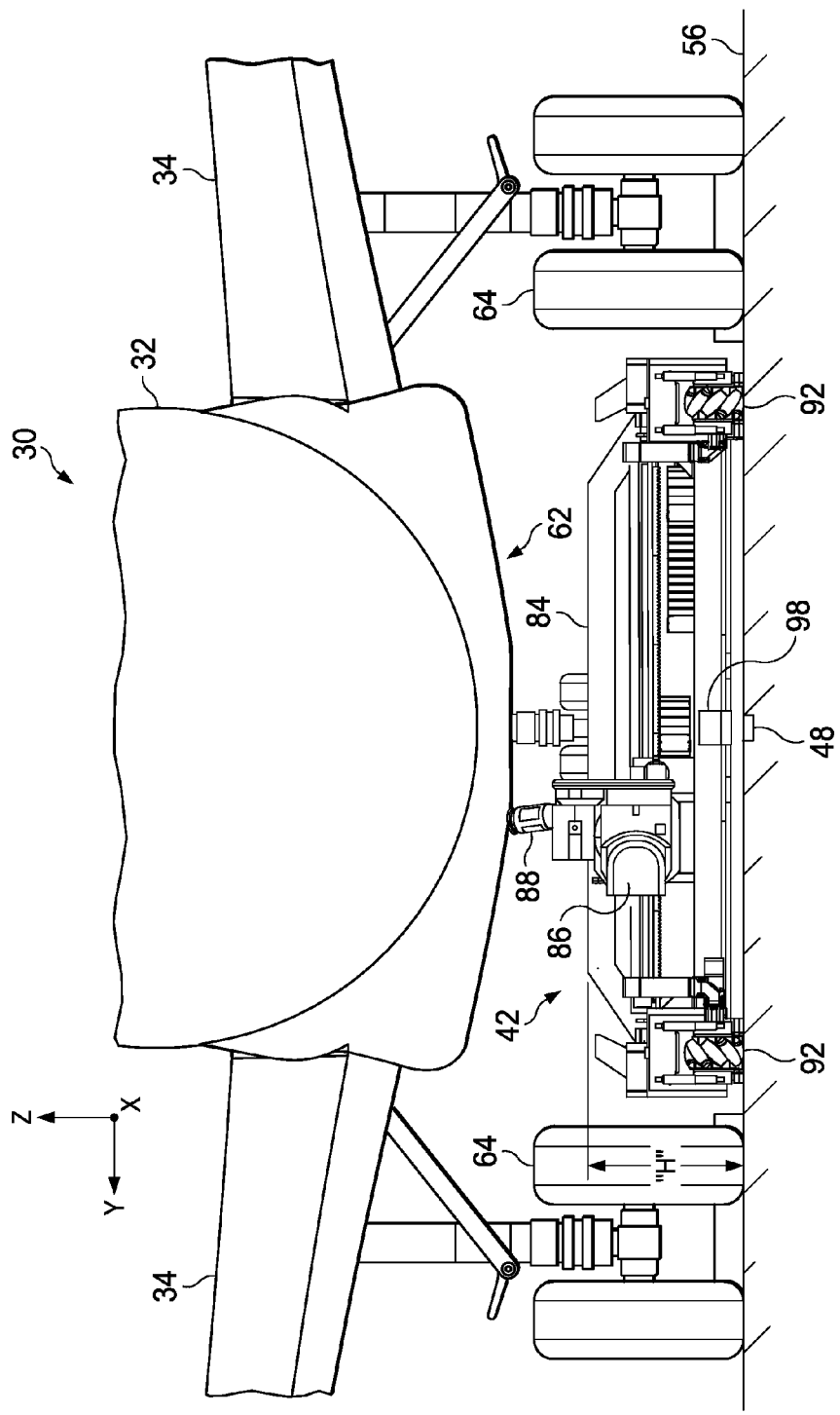
FIG. 8 is an illustration of a front elevational view of the aircraft and AGV shown in FIG. 6.

Attention is now directed to FIG. 6-8 which illustrate the AGV 42 in relationship to an aircraft 30 during surface treatment operations. The ground 56 or other surface on which the aircraft 30 is supported may include one or more features such as grating, access/utility pits, drainage, etc., that may require accommodation by, or special configuration of the AGV 42. In the illustrated example, the ground 56 includes embedded grates 56a for carrying away fluids used in the surface treatment process. In order to accommodate the grates 56a, the wheels 92 of the AGV 42 may be configured to span the grates 56a, while the guide wire 48 is embedded in, or placed on a strip on the ground 56 that lies between the grates 56a. As previously discussed, the AGV 42 is positioned between the wheels 64 of the aircraft and has a low profile with a height "H" that allows it to travel beneath the underbelly 62. The previously mentioned guide wire sensor 98 is centrally positioned on the AGV 42, laterally aligned with the underlying guide wire 48.

Multidirectional wheels 128 are used to both laterally move the AGV 42 into initial alignment with the guide wire 48, and transport the AGV 42 fore and aft (X-axis) along the centerline 70 of the aircraft 3. A robot 86 mounted on a gantry 84 carried on the AGV 42 has a lateral (Y-axis) "reach" that extends the width of the underbelly 62. The reach of the robot 86 is determined, in part, by the ability of the gantry 84 to move the robot 86 laterally (along the Y-axis), and longitudinally (along the X-axis) at each particular park position 44 of the AGV 42.

Figure 9:
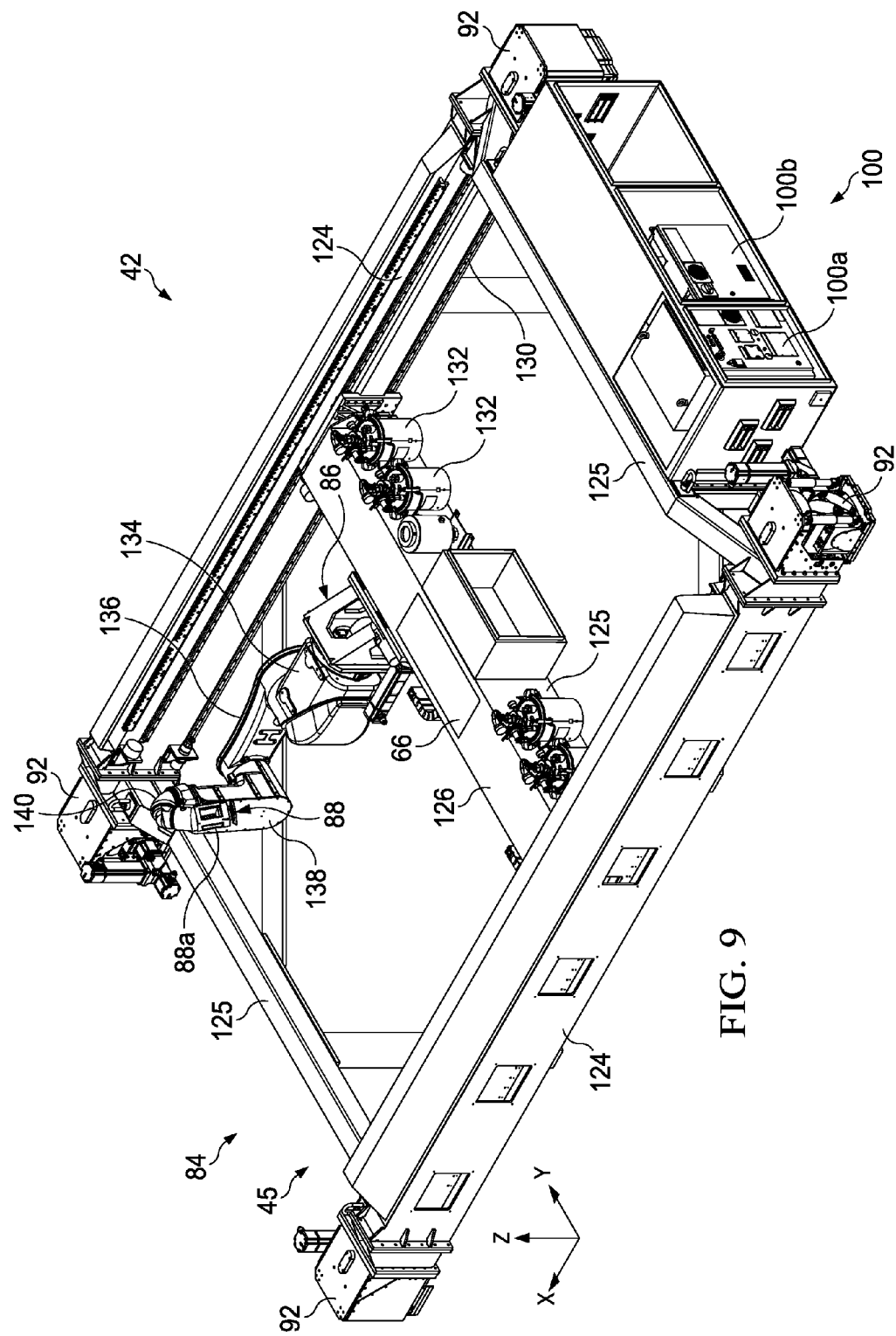
FIG. 9 is an illustration of a rear perspective view showing additional details of the AGV.
Figure 10:
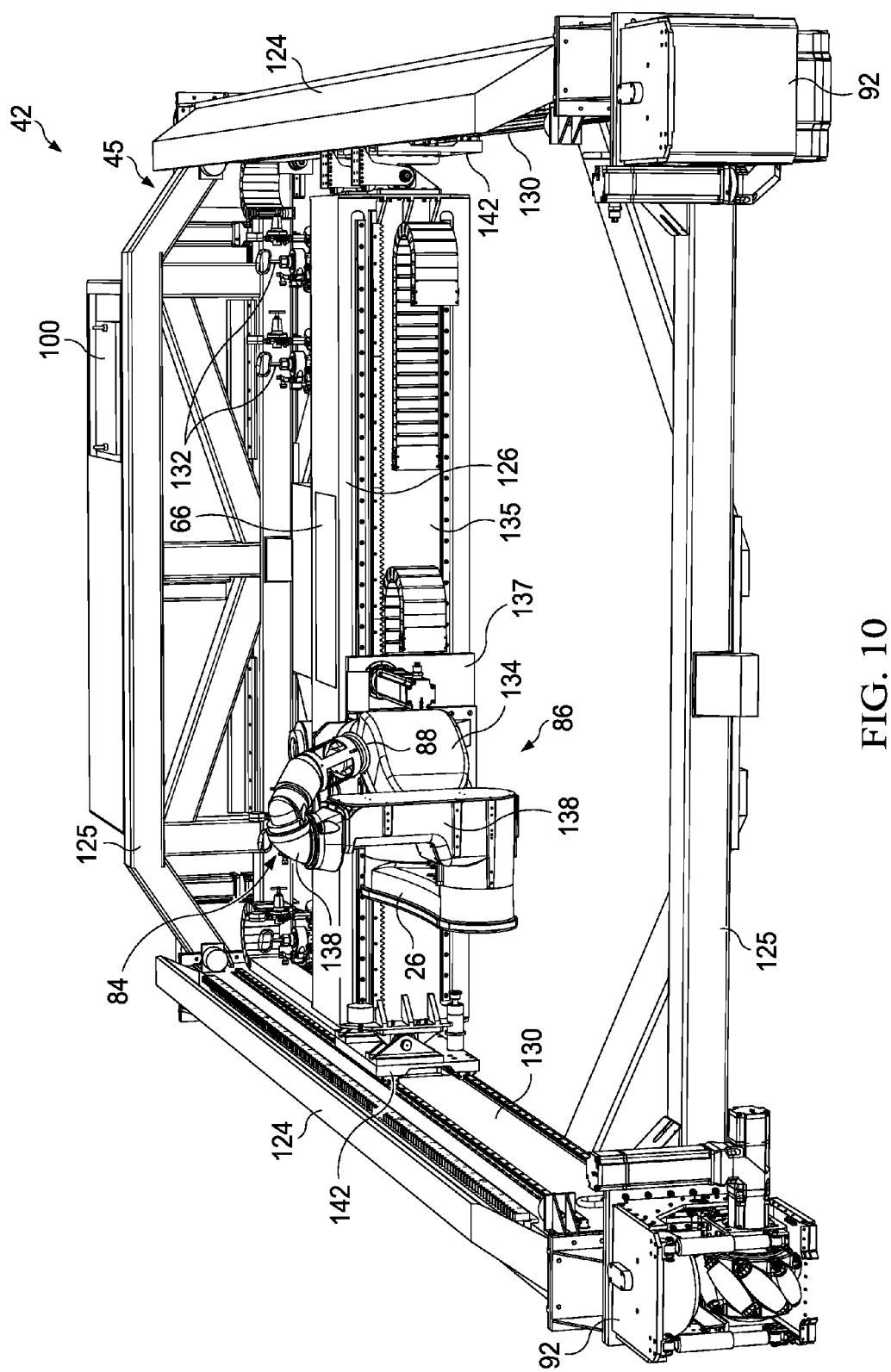
FIG. 10 is an illustration of a front perspective view of the AGV.
Figure 11:
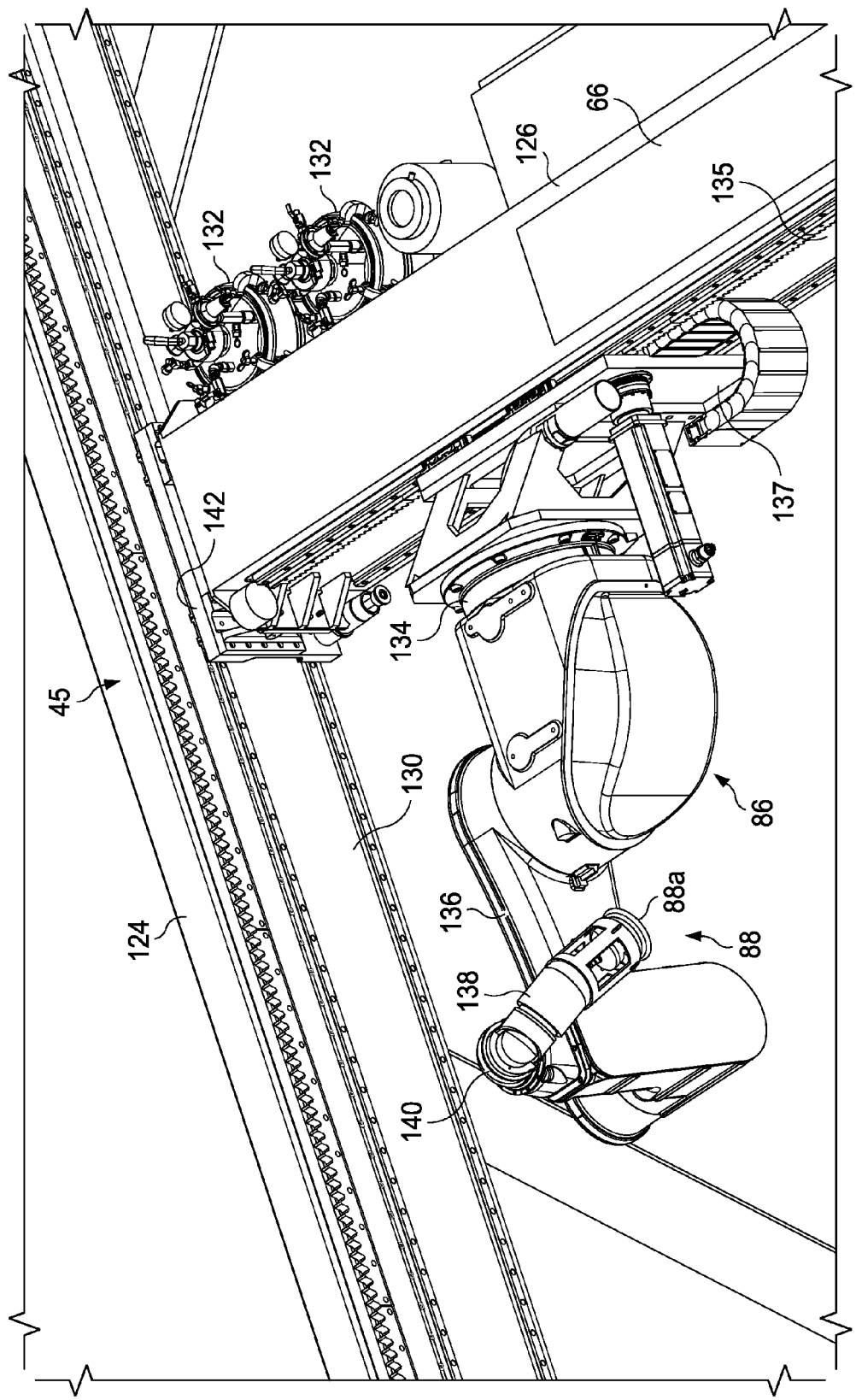
FIG. 11 is an illustration of an upper perspective view showing details of the robot.

Reference is now made to FIGS. 9-11 which illustrate additional details of the AGV 42. The AGV 42 has a frame 45 comprising a pair of side beams 124 joined by a pair of end supports 125. The gantry 84 comprises a laterally extending gantry cross beam 126 mounted for movement along a pair of longitudinally extending rails 130 that are respectively secured to the side beams 124. Drive plates 142 (FIGS. 10 and 11) mount opposite ends of the gantry cross beam 126 on rails 130 and are adapted to be motor driven for moving the gantry cross beam 126 along the rails 130 at each park position 44 of the AGV 42.

The AGV 42 includes a wheel 128 mounted on each corner of the frame 45. One or more of the previously mentioned controllers 100 are mounted at any suitable location on the frame, such as on one of the end supports 125. In the illustrative embodiment, the controller's 100 may include an AGV controller 100a for controlling operations of the AGV and performing calculations required to align the AGV with the aircraft 30, and a robot controller 100b for controlling operation of the robot 86. Material supplies 106 (FIG. 5) or other ancillary equipment 132 required for surface treatment operations may be mounted on the gantry cross beam 126 or at other locations on frame 45. One or more scanners 66 for scanning the underbelly 62 as previously described, may be mounted at any suitable location on the AGV 42, such as on the gantry cross beam 126.

A gantry rail 135 is mounted on one side of the gantry cross beam 126. A mounting plate 137 mounts the robot 86 on the gantry rail 135 for motor driven movement along the gantry cross beam 126. In one embodiment, the robot 86 includes a turret 134, an inner arm 136 and an outer arm 138 connected to the inner arm 136 by a knuckle 140, all configured to provide for 6 degrees of freedom. Any of a plurality of end effectors 88 may be interchangeably mounted on the outer arm 138. In the illustrative example, the end effector 88 comprises a sanding head 88a. A variety of other types of robots may be mounted on the gantry cross beam 126 depending on the application.

Figure 12:
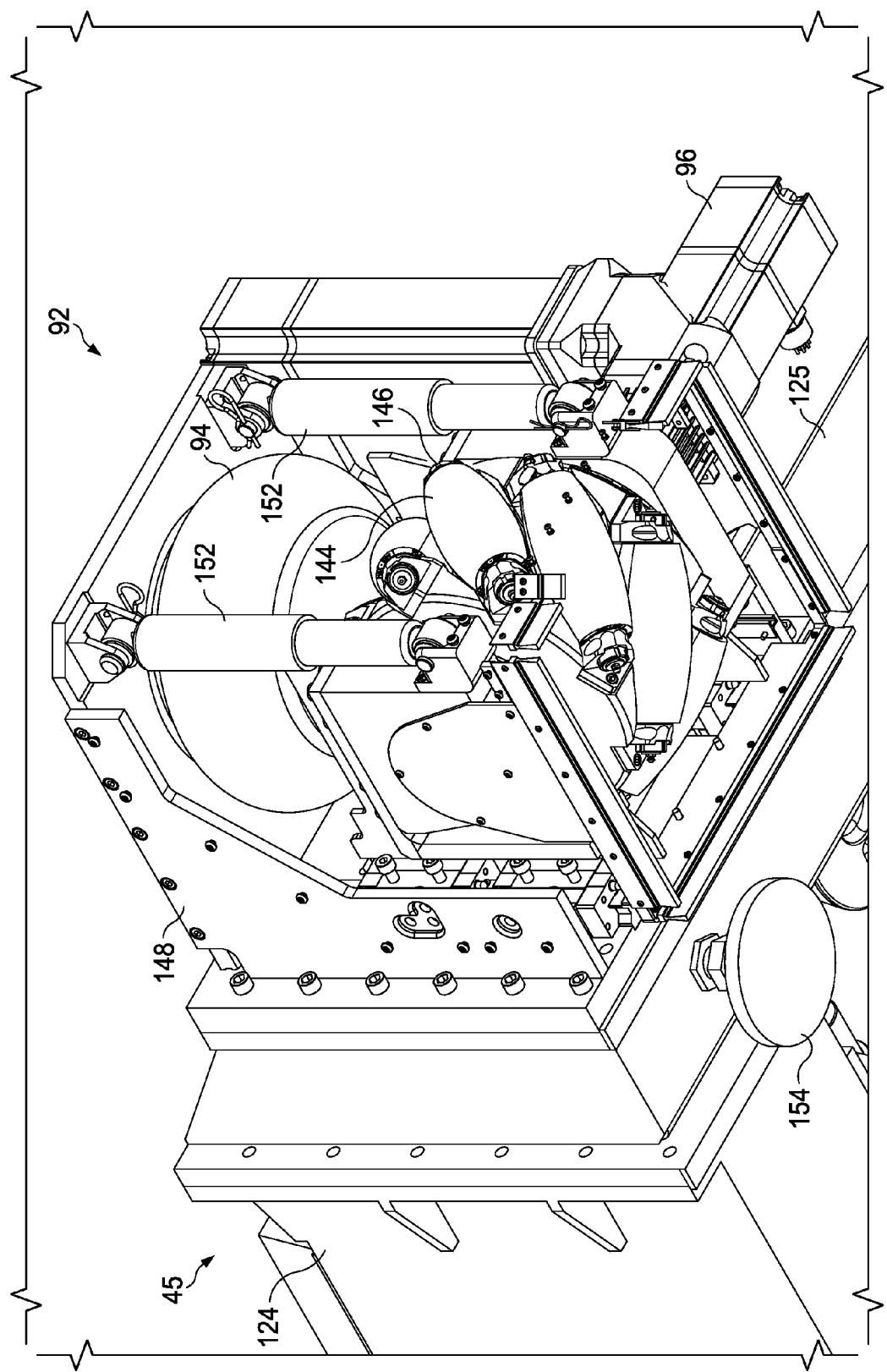
FIG. 12 is an illustration of a lower perspective view showing details of one of the AGV's wheels.

FIG. 12 illustrates additional details of one of the wheels 128. Each of the wheels 128 is mounted on one of the end supports 125 by a bracket 148. In the illustrative embodiment, the wheel 128 is a Mecannum type wheel comprising a plurality of diagonally oriented rollers 144 mounted circumferentially around a rotatable wheel hub 146 that is driven by an electric wheel motor 96. While a Mecannum type wheel is illustrated, other types of omnidirectional-capable wheels may be employed. The wheel 128 also includes shock absorbers 152, and an inflatable airbag 94 for lowering hard points 154 on the AGV 42 onto the ground. In order to lift the AGV 42 off the ground in preparation for realignment or movement of the AGV 42 between park positions, the airbag 94 is inflated. Inflation of the airbag 94 raises the AGV 42 onto the rollers 144.

Figure 13:
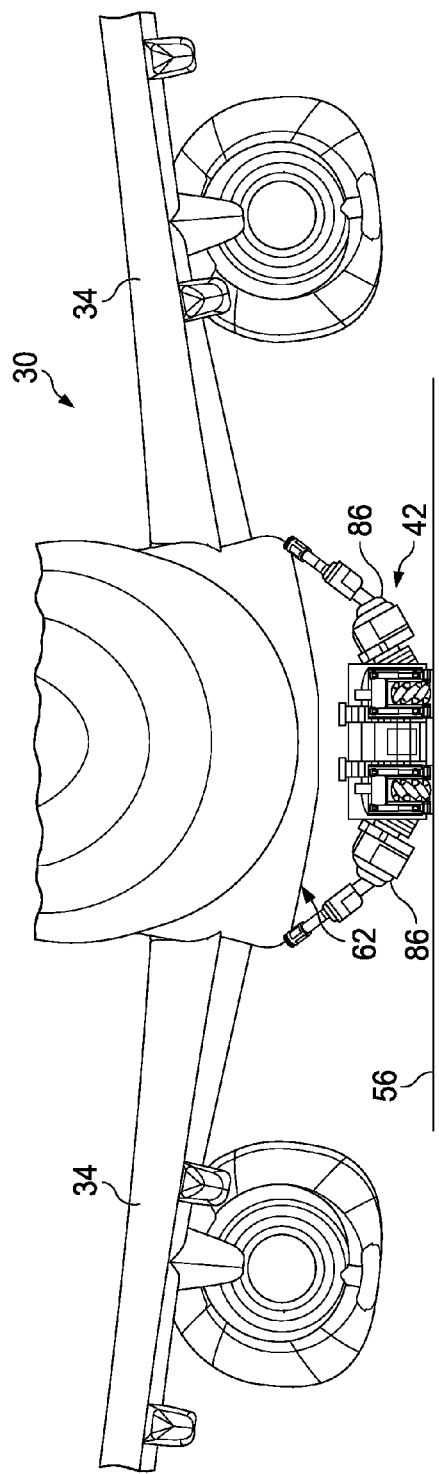
FIG. 13 is an illustration of a front elevational view of an aircraft and an alternate embodiment of the AGV.
Figure 14:
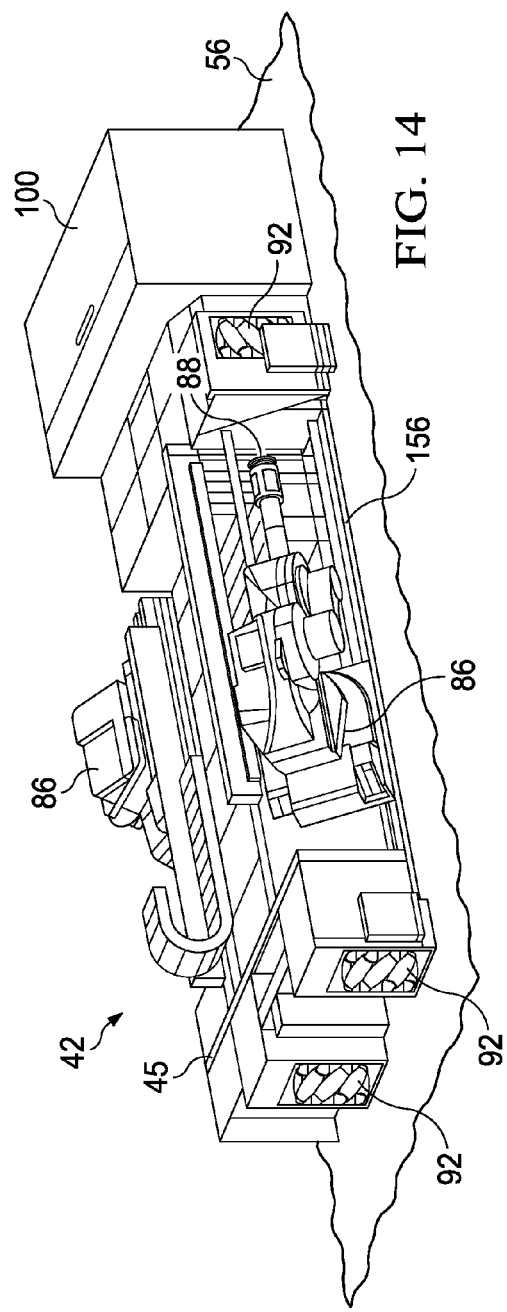
FIG. 14 is an illustration of a perspective view showing additional details of the AGV shown in FIG. 13.

Attention is now directed to FIGS. 13 and 14 which illustrate an alternate embodiment of the AGV 42. In this embodiment, the AGV 42 includes a pair of robots 86 mounted on a frame 45 provided with omnidirectional wheels 128 and other features similar to the embodiment previously described. Each the robots 86 includes an end effector 88 for performing surface treatment of an area of the underbelly 62. The same type of end effector 88 (e.g. a sander head) is mounted on each of the two robots 86 in order to simultaneously support the same surface treatment operation, such as for example and without limitation, a surface preparation operation. The robots 86 are mounted on rails 156 located on each side of the frame 45, for movement along the X-axis at each park position beneath the underbelly 62. The total reach of the AGV 42 at each park position is defined by the combined reaches of the two robot 86 as well as the length the robots 86 may travel along the rails 156 at each park position.

In the embodiment of the AGV 42 shown in FIGS. 6-12, the ability to perform surface treatments in the lateral (Y axis) direction at a particular park position 44 is determined by combination of the reach of the robot 86 and its ability to travel in the Y axis direction along the cross beam 126, whereas the ability of the robot 86 shown in FIGS. 13 and 14 to perform surface treatment in the lateral direction is substantially entirely dependent upon the reach of the robot 86. A variety of other robotic configurations are possible that may combine features of both the embodiment shown in FIGS. 6-12 and the embodiment shown in FIGS. 13 and 14.

Figure 15:
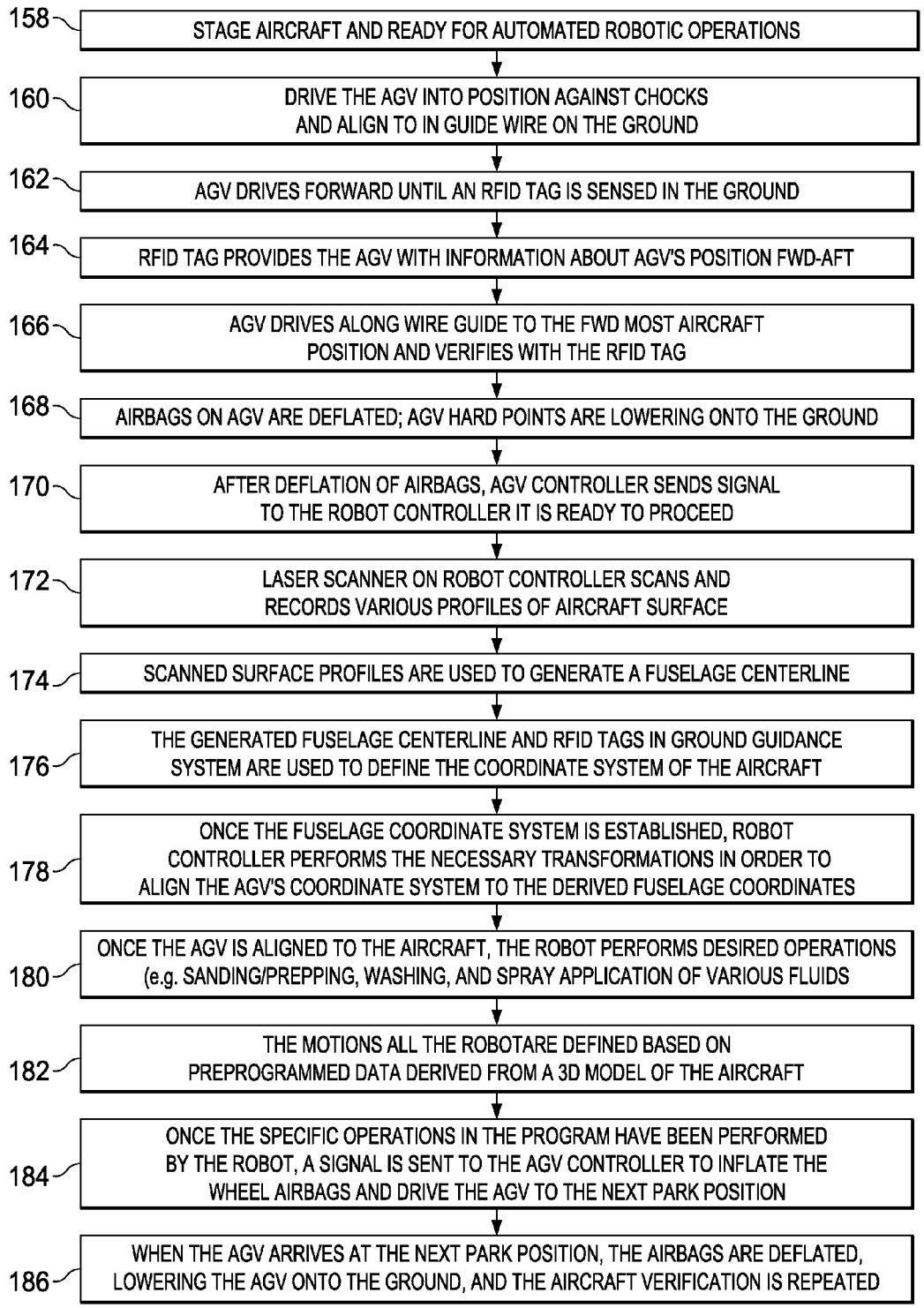
FIG. 15 is an illustration of a detailed flow diagram of a method of preparing and painting the underbelly of an aircraft using the AGV.

FIG. 15 illustrates additional details of a method of performing surface treatment of the underbelly 62 of an aircraft 30 using the AGV 42 and ground guidance system 55 previously described. Beginning at 158, the aircraft 30 is staged and parked, in readiness for automated robotic operations. At 160, the AGV 42 is driven to a position against a set of chocks 52 and aligned with a guide wire 48 located on the ground 56 beneath the aircraft 30. At 162 the AGV 42 drives forward until an RFID tag 49 or similar location marker is sensed in or on the ground 56. As shown at 164, a sensed RFID tag 49 provides the AGV 42 with information about the AGV's position in the fore-aft direction (X-axis). At 166, the AGV 42 drives along the guide wire 48 to the forward most position beneath the aircraft 30 and verifies this position by sensing the forward most RFID tag 49.

At 168, airbags 94 on the AGV wheels 128 are deflated, thereby lowering hard points 154 on the AGV 42 onto the ground 56. At 170, after deflation of the airbags 94, the AGV controller 100a sends a signal to the robot controller 100b that it is ready to proceed. At 172 a laser scanner on the AGV 42 scans and records various profiles 46 of the underbelly surface of the aircraft or other area where surface treatment is to be carried out. At 174, the scan surface profiles 46 are used to generate a fuselage centerline. At 176 the generated fuselage centerline 70 and the RFID tags 49 in the ground 56 are used to define the coordinate system of the aircraft 30. At 178 with the fuselage coordinate system having been established, the robot controller 100b performs the necessary transformations in order to align equipment system of the AGV 42 to the derived fuselage coordinates.

At 180, with the AGV 42 having been aligned to the aircraft 30, the robot 86 then performs the desired surface treatment operations such as, for example, sanding, prepping, washing and spray application of various fluids. At 182, the motion of the robot 86 is defined based on preprogrammed data defined by a 3-D CAD model of the aircraft 30. At 180, once the specific operations of the program have been performed by the robot 86, a signal is sent to the AGV controller 100a to inflate the airbag 94, thereby lowering the wheels 128 onto the ground 56, allowing the AGV 42 to drive to the next park position 44. When the AGV 42 arrives at the next park position 44, the airbags 94 are deflated, lowering the AGV 42 onto the ground, and the aircraft verification described above is repeated.

Figure 16:
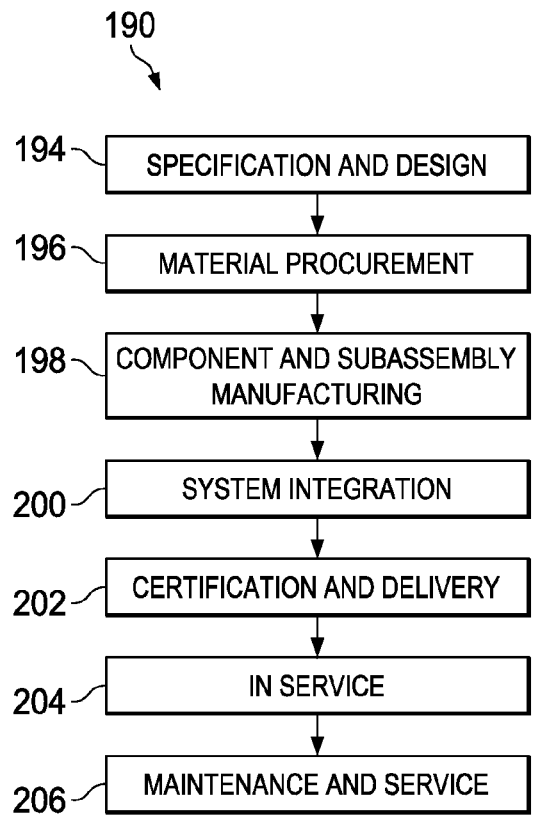
FIG. 16 is an illustration of a flow diagram of aircraft production and service methodology.
Figure 17:
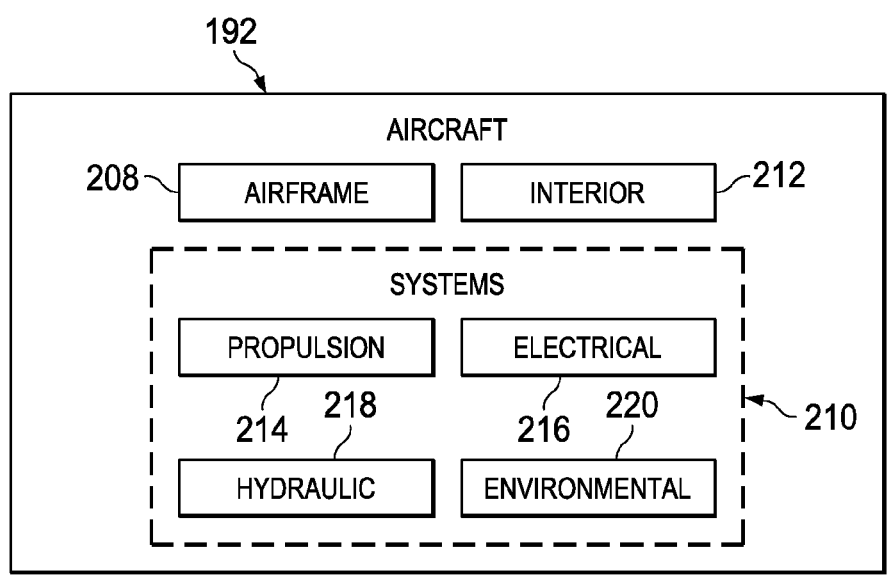
FIG. 17 is an illustration of a block diagram of an aircraft.

Embodiments of the disclosure may find use in a variety of potential applications, particularly in the transportation industry, including for example, aerospace, marine, automotive applications and other application where automated treatment of surfaces may be required. Thus, referring now to FIGS. 16 and 17, embodiments of the disclosure may be used in the context of an aircraft manufacturing and service method 190 as shown in FIG. 16 and an aircraft 192 as shown in FIG. 17. Aircraft applications of the disclosed embodiments may include, for example, without limitation, sanding, scuffing, washing, and/or painting of various surfaces of the aircraft 192. During pre-production, exemplary method 190 may include specification and design 194 of the aircraft 192 and material procurement 196. During production, component and subassembly manufacturing 198 and system integration 200 of the aircraft 192 takes place. Thereafter, the aircraft 192 may go through certification and delivery 202 in order to be placed in service 204. While in service by a customer, the aircraft 192 is scheduled for routine maintenance and service 206, which may also include modification, reconfiguration, refurbishment, and so on.

Each of the processes of method 190 may be performed or carried out by a system integrator, a third party, and/or an operator (e.g., a customer). For the purposes of this description, a system integrator may include, without limitation, any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 192 produced by exemplary method 190 may include an airframe 208 with a plurality of systems 210 and an interior 212. Examples of high-level systems 210 include one or more of a propulsion system 214, an electrical system 216, a hydraulic system 218 and an environmental system 220. Any number of other systems may be included. The disclosed embodiments may be employed to perform surface treatments of the outer skin of the aircraft 192 which forms part of the airframe 208. Although an aerospace example is shown, the principles of the disclosure may be applied to other industries, such as the marine and automotive industries.

Systems and methods embodied herein may be employed during any one or more of the stages of the production and service method 190. For example, components or subassemblies corresponding to production process 198 may have surfaces that are treated in a manner similar to the aircraft's outer skin while the aircraft 192 is in service. Also, one or more apparatus embodiments, method embodiments, or a combination thereof may be utilized during the production stages 198 and 200, for example, by substantially expediting production of or reducing the cost of an aircraft 192. Similarly, one or more of apparatus embodiments, method embodiments, or a combination thereof may be utilized while the aircraft 192 is in service, for example and without limitation, in connection with its maintenance and service 206.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. Apparatus for automated treatment of a surface of a structure, comprising:
    an automated guided vehicle (AGV) configured to travel along a path in proximity to the structure;
    a plurality of position markers spaced apart from each other along the path, each of the position markers defining a position of the AGV at which automated treatment of the surface is to be performed;
    at least one sensor on the AGV for sensing each of the position markers;
    a gantry mounted on the AGV for movement along a first axis;
    at least one robot mounted on the gantry for movement along a second axis;

an end effector mounted on the robot for performing treatment of the surface; and at least one controller configured to control the AGV, the gantry and the robot.

2. The apparatus of claim 1, wherein the gantry includes:

a pair of side beams, and a gantry cross beam mounted for movement along the pair of side beams, and wherein the robot is mounted for movement along the gantry cross beam.

3. The apparatus of claim 1, wherein each of the plurality of position markers is a radio frequency identification (RFID) tag.

4. The apparatus of claim 3, wherein the at least one sensor includes at least one RFID reader.

5. The apparatus of claim 1, further comprising:

a scanner on the AGV for scanning the surface of the structure at each of a plurality of positions along the path.

6. The apparatus of claim 1, wherein the AGV includes wheels configured for multi-directional movement.

7. The apparatus of claim 1, further comprising:

a mobile support vehicle having an on-board electrical power supply for supplying electrical power to the AGV;

a pressurized air supply for supplying air to the AGV; and, an umbilical cord coupling the mobile support vehicle with the AGV for conveying electrical power and pressurized air to the AGV.

8. Apparatus for performing surface treatment of an underbelly of an aircraft, comprising:

an automated guided vehicle (AGV) capable of traveling beneath the underbelly and along a path;

at least one robot mounted on the AGV;

an end effector mounted on the robot for performing surface treatment of the underbelly;

a guidance system for guiding travel of the AGV along the path; and a position detection system for detecting a position of the AGV along the path.

9. The apparatus of claim 8, wherein the AGV includes wheels configured to allow multi-directional movement of the AGV on a supporting surface.

10. The apparatus of claim 8, further comprising:

an X-Y gantry mounted on the AGV, and wherein the robot is mounted on the X-Y gantry for movement along X and Y orthogonal axes.

11. The apparatus of claim 8, wherein the end effector includes one of a sander and a spray head configured to spray a liquid onto a surface of the underbelly.

12. The apparatus of claim 8, wherein:

the guidance system includes a guide wire at a position extending along the path, and a sensor on-board the AGV for sensing the location of the guide wire, and the position detection system includes a plurality of radio frequency identification (RFID) tags spaced apart from each other along the path.

13. The apparatus of claim 8, further comprising:

material supplies carried on-board the AGV for use in surface treatment of the underbelly.

14. The apparatus of claim 8, further comprising a controller on-board the AGV for determining the position of the AGV relative to the aircraft and controlling movement of the AGV along the path beneath the underbelly.

* * * * *